(12) United States Patent
Frana et al.

(10) Patent No.: US 7,025,684 B2
(45) Date of Patent: Apr. 11, 2006

(54) UNIVERSAL JOINT

(75) Inventors: John C. Frana, Loves Park, IL (US);
James N. Olson, Rockford, IL (US);
Sean M. Carlini, Rockford, IL (US)

(73) Assignee: Aircraft Gear Corporation, Rockford, IL (US)

( * ) Notice: Subject to any disclaimer, the term of this patent is extended or adjusted under 35 U.S.C. 154(b) by 0 days.

(21) Appl. No.: 10/447,020

(22) Filed: May 28, 2003

(65) Prior Publication Data

US 2004/0242337 A1 Dec. 2, 2004

(51) Int. Cl.
*F16D 3/224* (2006.01)

(52) U.S. Cl. ....................... 464/145; 464/906
(58) Field of Classification Search .............. 464/145, 464/146, 906; 384/523, 527; 29/898.067
See application file for complete search history.

(56) References Cited

U.S. PATENT DOCUMENTS

| | | | |
|---|---|---|---|
| 1,665,280 A | 4/1928 | Rzeppa | |
| 4,915,672 A | 4/1990 | Girguis | |
| 4,942,652 A | 7/1990 | Hazebrok et al. | |
| 5,290,203 A | 3/1994 | Krude | |
| 5,451,185 A | 9/1995 | Krude et al. | |
| 5,501,639 A | 3/1996 | Krude | |
| 5,509,856 A | 4/1996 | Welschof | |
| 5,509,857 A | 4/1996 | Flaugher | |
| 5,531,643 A | 7/1996 | Welschof | |
| 5,725,432 A * | 3/1998 | Konegen et al. | 464/145 |
| 6,220,967 B1 * | 4/2001 | Miller | 464/145 |
| 6,749,517 B1 * | 6/2004 | Ouchi | 464/906 X |
| 2001/0002369 A1 * | 5/2001 | Kobayashi et al. | 464/145 |
| 2002/0022528 A1 * | 2/2002 | Nakagawa et al. | 464/145 |
| 2004/0005931 A1 * | 1/2004 | Wang et al. | 464/145 |

OTHER PUBLICATIONS

Spicer® Constant Velocity Components For Front Wheel Drive Vehicles, Weatherly Index 090, CVJ-1-SDS, Apr. 1985.

* cited by examiner

*Primary Examiner*—Greg Binda
(74) *Attorney, Agent, or Firm*—Michael Best & Friedrich LLP

(57) ABSTRACT

A universal joint includes an inner race, an outer race, a ball cage, and balls positioned within windows of the ball cage. One end of the ball cage extends beyond the windows further than the other end of the ball cage.

18 Claims, 4 Drawing Sheets

UNIVERSAL JOINT

BACKGROUND OF THE INVENTION

The present invention relates to mechanical joints and particularly to universal joints. More particularly, the present invention relates a universal joint having a cage positioned between an inner and outer race.

Conventional universal joints include "Rzeppa" joints, as described in U.S. Pat. No. 1,665,280, the disclosure of which is incorporated by reference herein. As shown in U.S. Pat. No. 1,665,280, and as will be readily understood by those of ordinary skill in the art, a Rzeppa joint couples two shafts together using a ball cage movably positioned between an inner and outer race. A plurality of ball bearings positioned in windows of the cage movably couple the outer race, cage, and inner race to each other.

SUMMARY OF THE INVENTION

The high stresses placed on universal joints and particularly on the ball cages of constant velocity (CV) universal joints cause the cages to fatigue and fail. Particularly, in off-road vehicles, universal joints in the wheels of the vehicles undergo extreme stresses. A universal joint having a high-strength ball cage would be welcomed by users of such joints.

According to the present invention, a universal joint comprises an outer race and an inner race movable within the outer race. A cage is movably positioned between the inner race and the outer race and has a first ring, a second ring positioned substantially parallel to and spaced apart from the first ring, and a plurality of webs extending between and positioned substantially perpendicularly to the first and second rings. The first ring has a greater width than the second ring. A plurality of balls is positioned between the webs.

According to another embodiment of the present invention, a universal joint comprises an outer race and an inner race moveable within the outer race. A cage is moveably positioned between the inner race and the outer race and includes a first ring, a second ring positioned substantially parallel to and spaced apart from the first ring, and a plurality of webs extending between and positioned substantially perpendicularly to the first and second rings. The first ring includes a portion of decreased hardness relative to the remainder of the cage. A plurality of balls is positioned between the webs.

According to still another embodiment of the present invention, a universal joint comprises an outer race, an inner race moveable within the outer race, and a cage moveably positioned between the inner race and the outer race. The cage has a first ring, a second ring positioned substantially parallel to and spaced apart from the first ring, and a plurality of webs extending between the first and second rings. Consecutive webs define a window there between, providing a passageway from an outer surface of the cage to an inner surface of the cage, and the window has sidewalls that converge from the outer surface of the cage to the inner surface of the cage. A ball is positioned within the window.

According to yet another embodiment of the present invention, a method of manufacturing a universal joint comprises providing an inner race, an outer race, and a ball cage having a first ring, a second ring, and a plurality of webs coupling the first ring to the second ring. A portion of the first ring is masked and the ball cage is selectively hardened to increase the hardness of all but the masked portion of the ball cage. The ball cage is positioned between the inner race and the outer race. A plurality of balls is positioned between the webs.

According to another embodiment of the present invention, a universal joint comprises an inner race, an outer race movably positioned around the inner race, and a ball cage moveably positioned between the inner race and the outer race. The ball cage is shaped to form a hollow, truncated sphere having a plurality of windows extending from an outer surface of the hollow, truncated sphere to an inner surface of the hollow, truncated sphere. The windows separate first and second sections of the hollow, truncated sphere and the width of the first section is greater than the width of the second section. A plurality of balls is positioned within the windows.

Additional features and advantages of the invention will become apparent to those skilled in the art upon consideration of the following detailed description exemplifying the best mode of carrying out the invention as presently perceived.

BRIEF DESCRIPTION OF THE DRAWINGS

The detailed description particularly refers to the accompanying figures in which.

DETAILED DESCRIPTION

Figure 1:
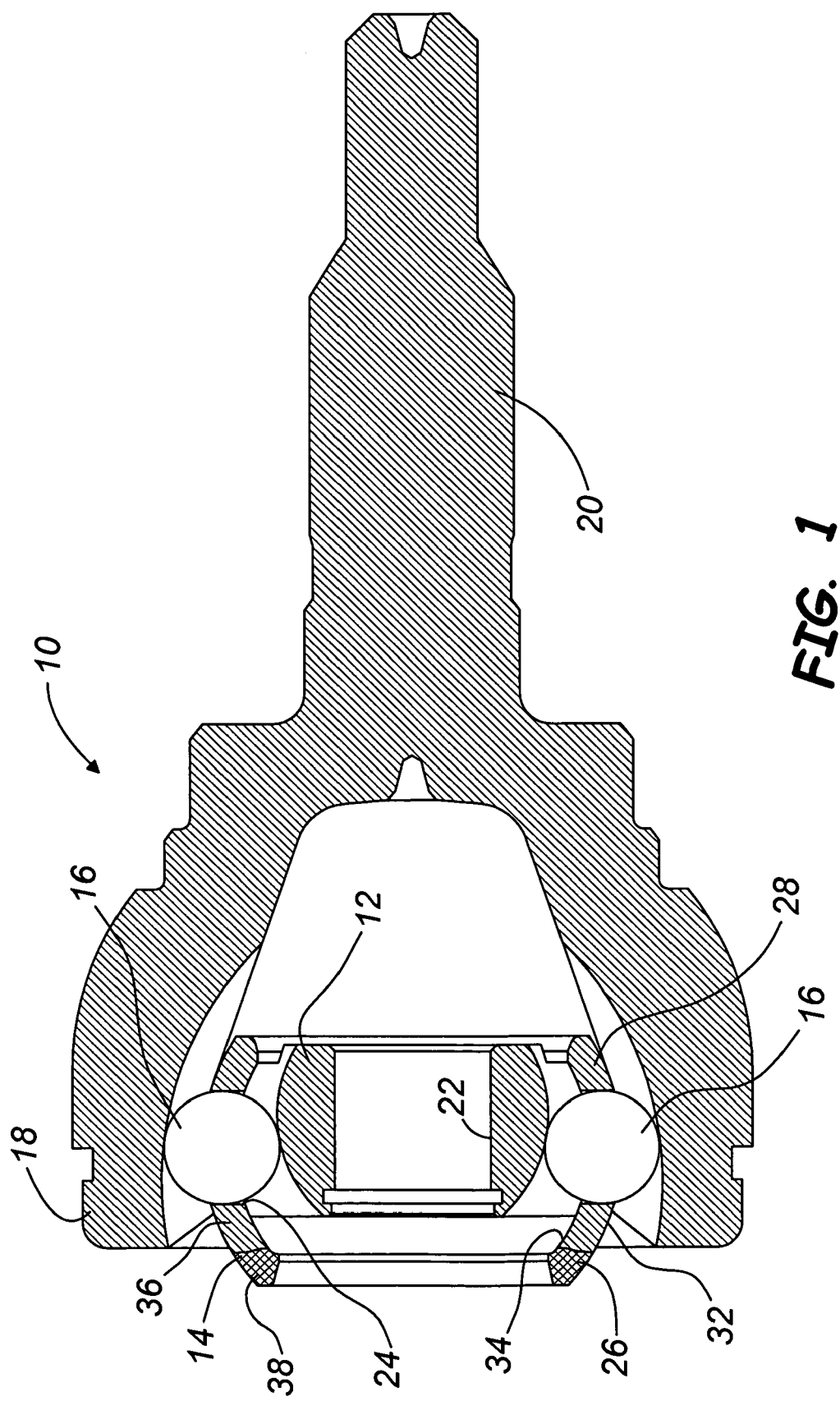
FIG. 1 is a side cross-sectional view of a universal joint in accordance with the present invention and showing a ball cage positioned between and inner and outer race.
Figure 2:
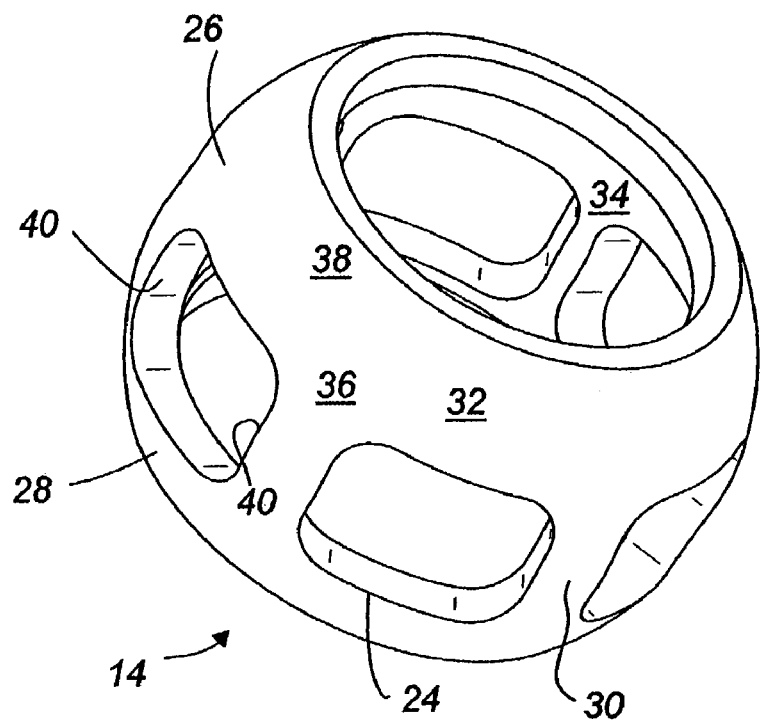
FIG. 2 is a perspective view of the ball cage of FIG. 1 including first and second rings spaced apart and coupled by webs.

As shown in FIG. 1, a constant velocity (CV) universal joint 10 according to the present invention includes an inner race 12, a ball cage 14, and a plurality of balls 16 housed within a housing or outer race 18. The joint 10 according to the present invention is used to couple two rotating shafts (not shown) together, as will be readily apparent to those of ordinary skill in the art. A first shaft (not shown) is splined to a stub 20 that is formed as part of the housing or outer race 18. A second shaft (not shown) is splined to an opening 22 formed within the inner race 12. For example, as will be readily apparent to those of ordinary skill in the art, a wheel hub of a vehicle could be coupled to the stub 20 and a transaxle could be coupled to the inner race 12. The balls 16 are positioned within windows 24 of the ball cage 14 to facilitate rotational and angular movement of the inner race 12, the cage 14, and the outer race 18 relative to one another.

Referring to FIGS. 2–5, the ball cage 14 comprises a generally truncated spherical shape including a first ring 26 and a second ring 28 coupled by webs 30, all preferably integrally formed. The first and second rings 26, 28 are substantially parallel to and spaced apart from each other.

The previously mentioned windows 24 are positioned between consecutive webs 30 and provide openings from an outer surface 32 of the cage 14 to an inner surface 34.

Figure 3:
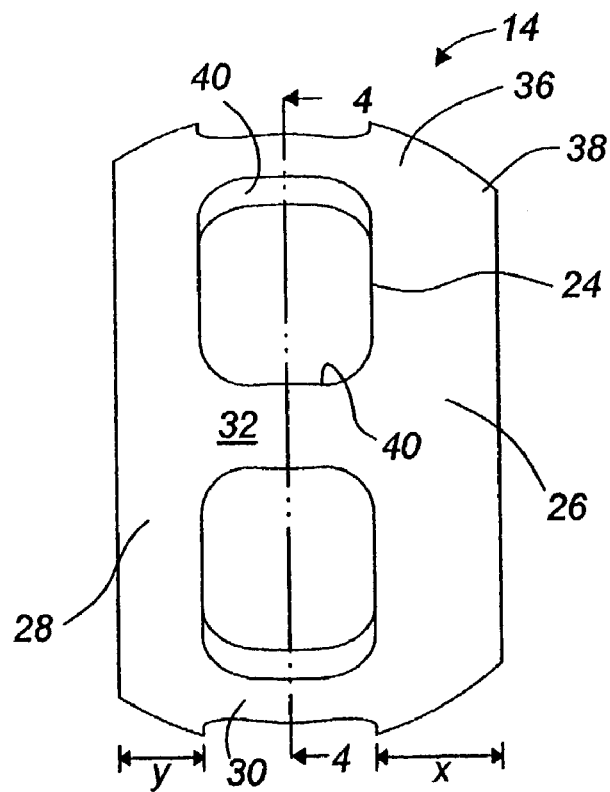
FIG. 3 is a side view of the cage of FIG. 1.

As best seen in FIG. 3, the first ring 26 includes a body portion 36 and an end portion 38, which extends the first ring 26 further out from the windows 24 than the second ring 28. In other words, the width X of the first ring 26 is greater than the width Y of the second ring 28. The widths X and Y are measured linearly by means known to those of ordinary skill in the art. For example, the cage 14 could be placed on a flat table and the height off the table of the edge of a window 24 could be measured. This would give one of the widths X or Y and the cage 14 could be flipped over and the measuring method repeated to measure the other of the widths X or Y.

As shown in FIG. 1, the end portion 38 provides additional extension of the first ring 26 as compared to the second ring 28, which is positioned closer than ring 26 to the stub 20 of the outer race or housing 18, thereby providing added material (e.g., steel) and thus strength to the cage 14 on the side remote from the stub 20. In some embodiments of the invention, the cage 14 may be selectively hardened so that the second ring 28, webs 30, and body portion 36 of the first ring 26 are of a first hardness and the end portion 38 of the first ring 26 is of a second, lesser hardness. The lesser hardness of the end portion 38 of the cage 14 gives more ductility to the cage 14 so that the end portion 38 of the cage 14 can plastically deform a little during movement of the various parts of the joint 10, rather than fail.

To harden the second ring 28, webs 30, and body portion 36 of the first ring 26, most of the cage 14 is carburized to infuse carbon into the steel of the cage 14. Prior to the carburizing process, the entire cage 14 is hardened by heating and quenching. The end portion 38 is then masked during the carburization process so that it is not infused with carbon like the rest of the cage 14. In this way, the end portion 38 maintains a ductility and a lesser hardness than the hardened, unmasked, portions of the cage 14, i.e. the second ring 28, webs 30, and body portion 36 of the first ring 26.

It will be readily apparent to those of ordinary skill in the art that various materials can be used for the parts of the joint 10, including the cage 14, whether the end portion 38 is of a different hardness or the same hardness as the rest of the cage 14. For example, the entire cage 14 could be constructed of a thru-hardening grade steel (e.g., 4340 (53 $R_c$) steel), or other suitable material, or a carburizing grade steel (e.g., 8620 (60 $R_c$) steel), or other suitable material, wherein the end portion 38 may be masked during carburizing, so it maintains a lesser hardness (e.g., 34–45 $R_c$) than the rest of the cage 14.

Figure 5:
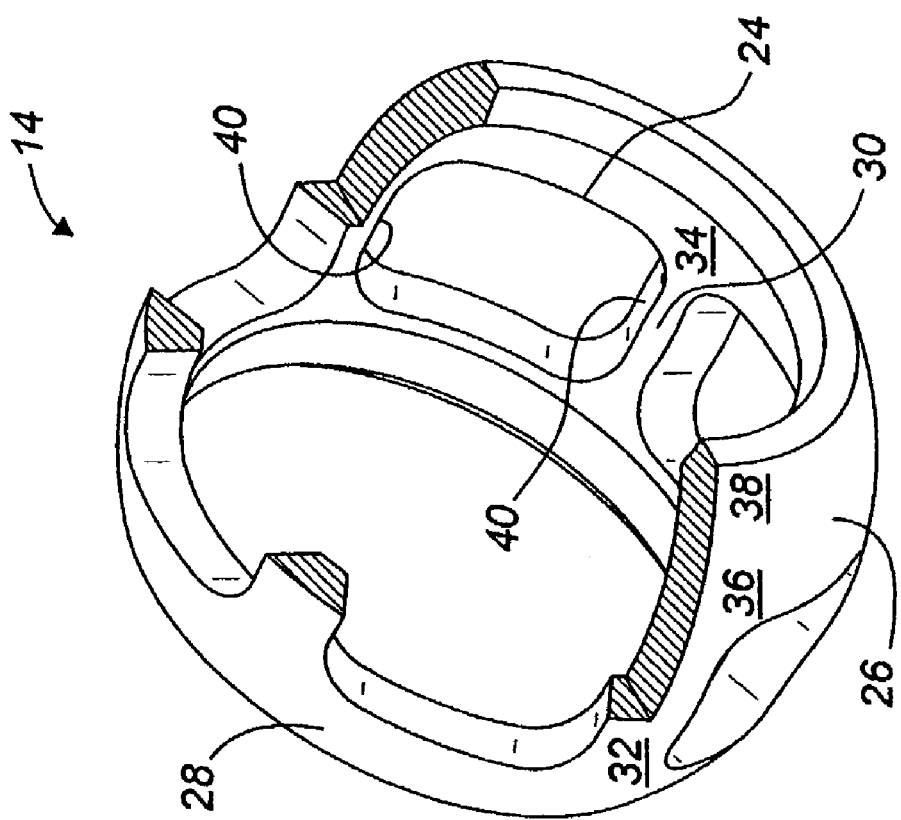
FIG. 5 is a perspective view with portions broken away of the cage of FIG. 1.
Figure 4:
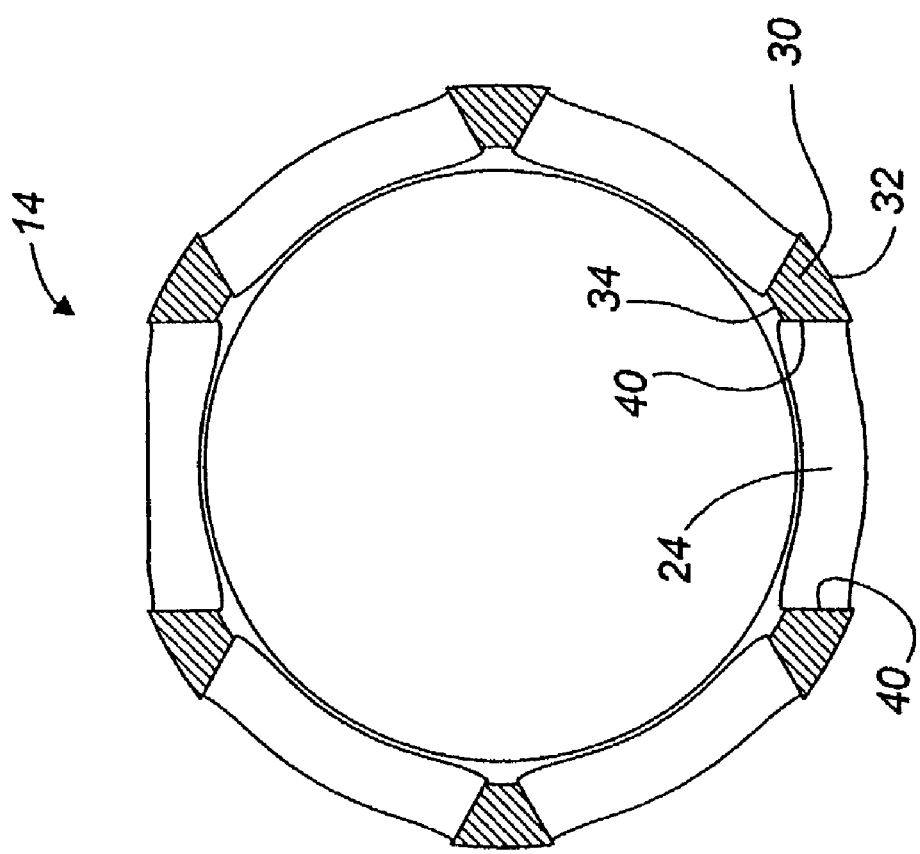
FIG. 4 is a cross-sectional view of the cage of FIG. 1 taken along line 4—4 of FIG. 3 and showing windows defined between consecutive webs of the cage and having sidewalls.

As best seen with reference to FIGS. 4 and 5, each window 24 is bounded on its sides by two sidewalls 40. The sidewalls 40 of a particular window 24 are part of the two adjacent webs 30 that frame the window 24. Put another way, the term "sidewall" as used herein refers to that part of the cage that helps to define a window 24. As shown in FIG. 4, the sidewalls 40 on opposite sides of window 24 are substantially parallel to each other. Within this structure and because of the generally spherical nature of the overall cage 14, the webs 30 between consecutive windows 24 necessarily taper in thickness from the outer surface 32 to the inner surface 34 of the cage 14.

Figure 6:
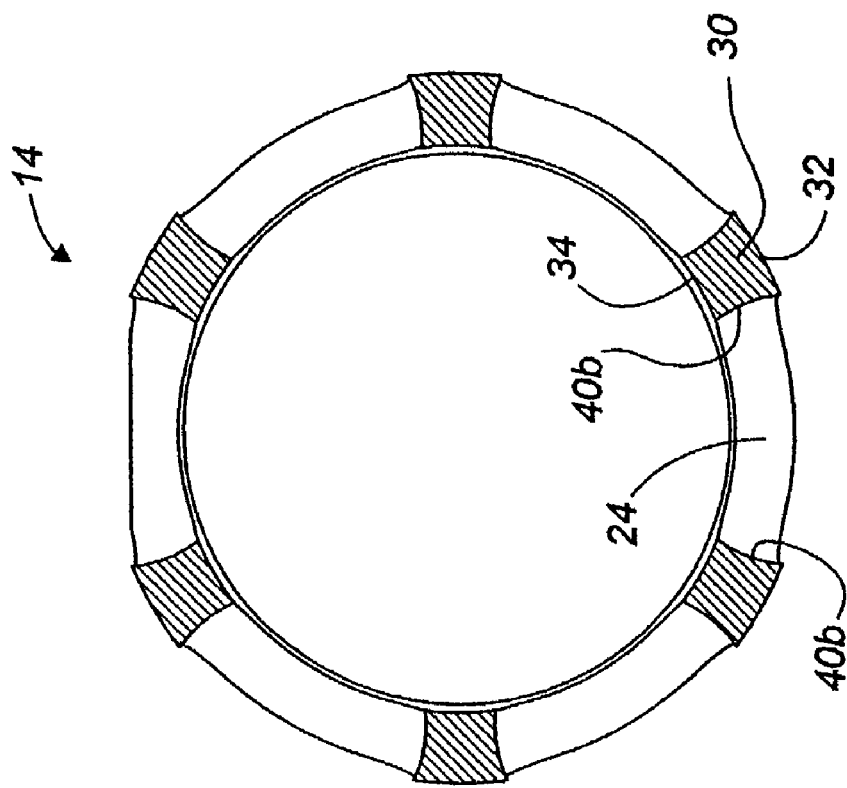
FIG. 6 is a cross-sectional view similar to FIG. 4 showing an alternative configuration of the sidewalls of the windows.

In other embodiments of the present invention, other orientations of the sidewalls of the windows produce alternative cross-sectional configurations of the webs 30a between the windows 24a. For example, referring to FIG. 6, the windows 24a have sidewalls 40a that slightly converge toward each other from the outer surface 32a to the inner surface 34a of the cage 14a. Consequently, the webs 30a taper less than webs 30, due to the configuration of their respective sidewalls 40a. Still referring to FIG. 6, this embodiment has a thicker web 30a (i.e., a web 30a with a greater cross-sectional area as compared to webs 30), thereby increasing its strength.

Figure 7:
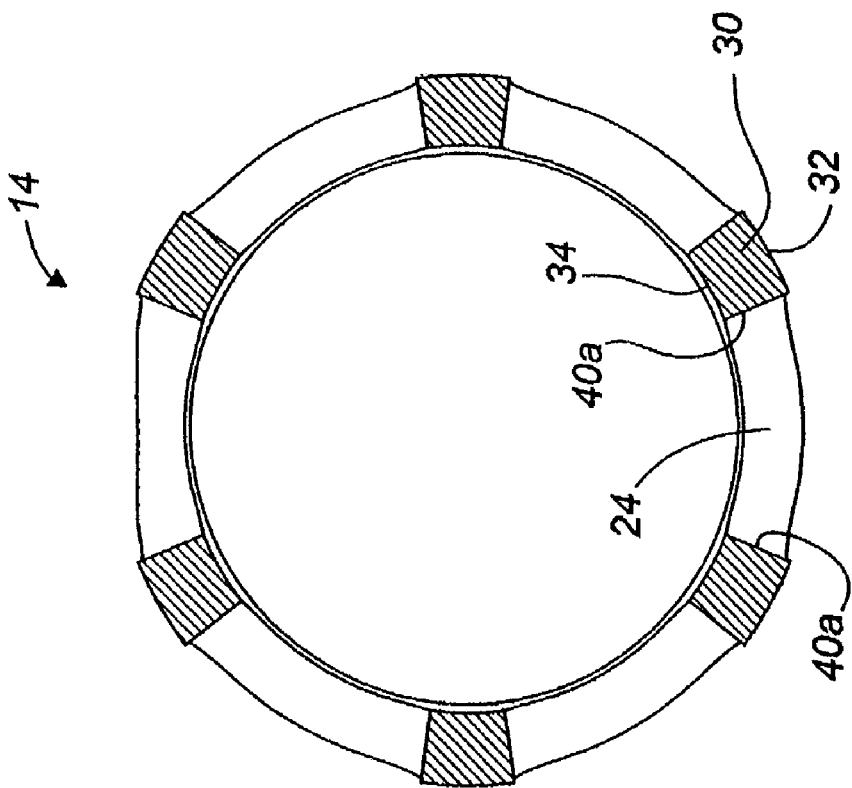
FIG. 7 is a cross-sectional view similar to FIG. 4 showing another alternative configuration of the sidewalls of the windows.

In another embodiment of the invention as shown in FIG. 7, the windows 24b have sidewalls 40b that are radiused. Thus, the webs 30b have a greater thickness at the inner surface 34b of the cage 14b, again increasing the strength of the webs 30b, as compared to the webs 30, due to the configuration of the sidewalls 40b.

Although the invention has been described in detail with reference to certain preferred embodiments, variations and modifications exist within the scope and spirit of the invention as described and defined in the following claims.

The invention claimed is:

1. A universal joint comprising:
   an outer race having a cavity defined by an inner surface of the outer race, the cavity having an open end and a closed end;
   an inner race moveable within the cavity of the outer race;
   a cage moveably positioned between the inner race and the outer race, the cage having a first ring, a second ring positioned substantially parallel to and spaced apart from the first ring, and a plurality of webs extending between the first and second rings, wherein the first ring has a greater width than the second ring, and wherein the first ring is disposed adjacent the open end of the cavity and the second ring is distal from the open end of the cavity; and
   a plurality of balls positioned between the webs and engageable with the inner surface of the outer race;
   wherein the inner surface of the outer race secures the cage and the plurality of balls in the cavity.

2. The universal joint of claim 1, wherein the first ring includes a body portion and an end portion, the body portion having a greater hardness than the end portion.

3. The universal joint of claim 2, wherein the body portion has a hardness of between 55 and 65 $R_c$.

4. The universal joint of claim 2, wherein the end portion has a hardness of between 35 and 45 $R_c$.

5. The universal joint of claim 2, wherein the cage comprises carburizing grade steel.

6. The universal joint of claim 1, wherein two webs define a window there between, the window having opposing sidewalls, the opposing sidewalls converging from an outside of the cage to an inside of the cage.

7. The universal joint of claim 1, wherein two webs define a window there between, the window having opposing sidewalls the sidewalls being radiused.

8. The universal joint of claim 1, wherein the inner surface of the outer race curves inwardly as the inner surface approaches the open end of the cavity.

9. The universal joint of claim 1, wherein the first ring has an end portion and a body portion, the body portion being adjacent the plurality of webs and between the webs and the end portion, the cage being selectively hardened so that the second ring, the webs and the body portion of the first ring are of a first hardness and the end portion of the first ring is of a second hardness less than the first hardness.

10. A universal joint comprising:
    an outer race;
    an inner race moveable within the outer race;
    a cage moveably positioned between the inner race and the outer race, the cage having a first ring, a second ring positioned substantially parallel to and spaced apart from the first ring, and a plurality of webs extending between the first and second rings, the first ring having an end portion and a body portion, the body portion being adjacent the plurality of webs and between the webs and the end portion, the cage being selectively hardened so that the second ring, the webs and the body portion of the first ring are of a first hardness and the end portion of the first ring is of a second hardness less than the first hardness; and a plurality of balls positioned between the webs.

11. The universal joint of claim 10, wherein the cage comprises 8620 steel.

12. The universal joint of claim 10, wherein the cage comprises 4340 steel.

13. The universal joint of claim 10, wherein the first ring has a greater width than the second ring.

14. The universal joint of claim 10, wherein the outer race defines a cavity having an open end, the open end of the cavity being smaller in area than an interior portion of the cavity spaced inwardly from the open end, and wherein the first ring is disposed adjacent the open end of the cavity and the second ring is disposed inwardly and distal from the open end of the cavity.

15. A universal joint comprising:

an inner race;

an outer race defining a cavity having an open end and a closed end, the inner race being positioned within the cavity and the outer race being moveable around the inner race, the open end of the cavity being smaller in area than an interior portion of the cavity spaced inwardly from the open end;

a ball cage moveably positioned between the inner race and the outer race, the ball cage shaped as a hollow, truncated sphere having a plurality of windows extending from an outer surface of the hollow, truncated sphere to an inner surface of the hollow, truncated sphere, the windows separating first and second sections of the hollow, truncated sphere, wherein the width of the first section is greater than the width of the second section and the first section is disposed adjacent the open end of the cavity and the second section is disposed inwardly and distal from the open end of the cavity; and a plurality of balls positioned within the windows.

16. The universal joint of claim 15, wherein the first section of the hollow, truncated sphere includes a portion of decreased hardness.

17. The universal joint of claim 16, wherein the portion of decreased hardness has a hardness of between 35 and 45 $R_c$.

18. The universal joint of claim 15, wherein the first section has an end portion and a body portion, the body portion being adjacent the plurality of windows and between the windows and the end portion, the ball cage being selectively hardened so that the second section and the body portion of the first section are of a first hardness and the end portion of the first section is of a second hardness less than the first hardness.

* * * * *